(12) United States Patent
Yamamoto

(10) Patent No.: US 8,714,047 B2
(45) Date of Patent: May 6, 2014

(54) STEERING DEVICE

(75) Inventor: Kou Yamamoto, Maebashi (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 13/379,246

(22) PCT Filed: Jul. 27, 2011

(86) PCT No.: PCT/JP2011/067042
§ 371 (c)(1),
(2), (4) Date: Jul. 3, 2012

(87) PCT Pub. No.: WO2012/023388
PCT Pub. Date: Feb. 23, 2012

(65) Prior Publication Data
US 2013/0133462 A1    May 30, 2013

(30) Foreign Application Priority Data

Aug. 17, 2010  (JP) .................................. 2010-182130

(51) Int. Cl.
*B62D 1/18* (2006.01)

(52) U.S. Cl.
USPC ........................................... 74/493; 280/779

(58) Field of Classification Search
USPC .............................. 74/492, 493; 280/775, 779
See application file for complete search history.

(56) References Cited

U.S. PATENT DOCUMENTS

| | | | | |
|---|---|---|---|---|
| 3,468,181 | A * | 9/1969 | Millar | 74/492 |
| 3,600,971 | A * | 8/1971 | Scarvelis et al. | 74/492 |
| 7,686,336 | B2 * | 3/2010 | Cullier et al. | 280/775 |
| 2008/0217901 | A1 * | 9/2008 | Olgren et al. | 280/775 |
| 2012/0085194 | A1 * | 4/2012 | Inoue | 74/493 |

\* cited by examiner

*Primary Examiner* — Justin Krause
(74) *Attorney, Agent, or Firm* — Crowell & Moring LLP

(57) ABSTRACT

A steering device is provided that prevents an inner column from coming out from an outer column even when the inner column is released from being telescopically clamped by the outer column in a state before mounting a vehicle body attaching bracket. Front ends of the telescopic position adjusting long grooves and are brought into contact with an outer peripheral face of a fastening rod at a rear end of a telescopically adjusting position. The fastening rod is moved to a rear side of the vehicle body and an engaging member outwardly fitted to the fastening rod is brought into contact with the collar. The fastening rod cannot be moved to a rear side of the vehicle body further, and the outer column and the vehicle body attaching bracket are prevented from coming out of the inner column.

4 Claims, 12 Drawing Sheets

Fig. 9
(a)
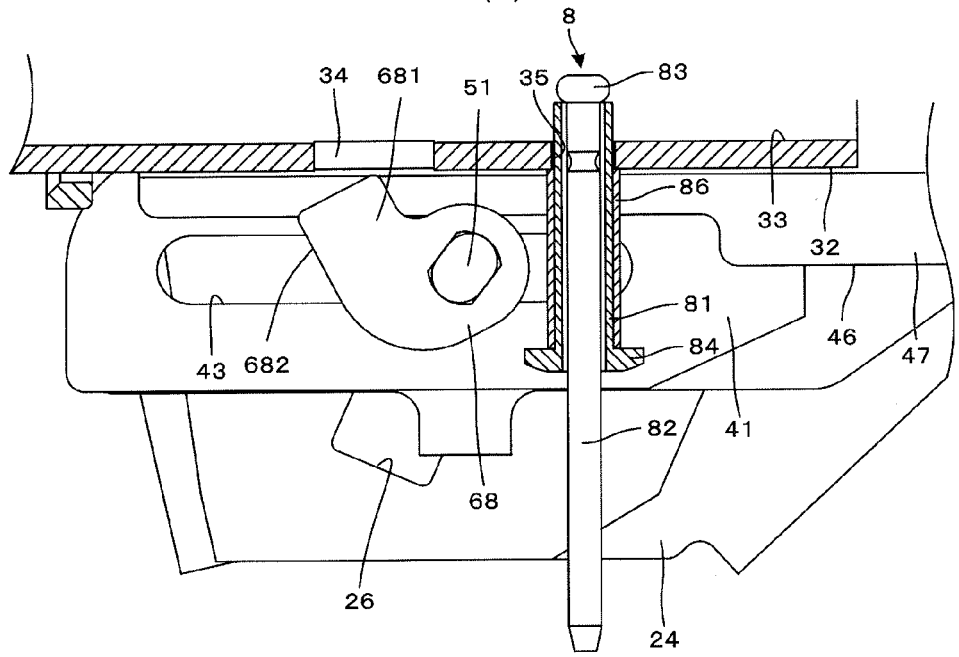
(b)
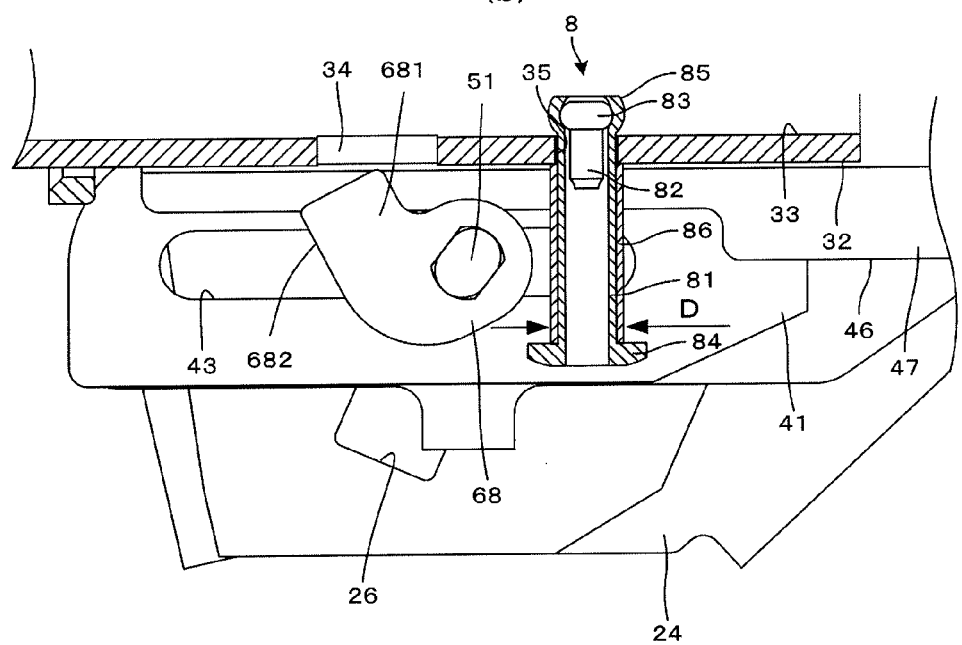

STEERING DEVICE

TECHNICAL FIELD

The present invention relates to a steering device, particularly relates to a steering device which adjusts a telescopic position of a steering wheel by fitting together an outer column and an inner column slidably in an axial direction and in which an impact load is absorbed by collapsingly moving the steering wheel to a front side of a vehicle body in second collision.

BACKGROUND ART

There is a steering device of a telescopic type which adjusts a telescopic position of a steering wheel by fitting together an outer column and an inner column slidably in an axial direction. Further, there is a steering device of a tilt telescopic type which adjusts both of a telescopic position and a tilt position of a steering wheel.

According to the steering devices, the inner column is clamped to the outer column relatively unmovably in the axial direction by contracting the outer column having a slit in a diameter thereof and fastening an outer periphery of the inner column by an inner periphery of the outer column after an adjustment of the telescopic position has been finished. A steering angle of a wheel is changed by transmitting rotation of the steering wheel to a steering gear by engaging a lower steering shaft with an upper steering shaft which is mounted with the steering wheel on a rear side of a vehicle body to be able to move telescopically by spline engagement or the like.

There is a case of releasing the inner column from being telescopically clamped to the outer column by erroneously operating an operating lever or the like in transporting the steering device, or in assembling a column cover or the like in a state before attaching a vehicle attaching bracket of the steering device to the vehicle body. When the steering wheel is pulled to the rear side of the vehicle body under the state, there is a case in which the outer column comes out from the inner column along with the vehicle body attaching bracket, and also the spline engagement of the steering shaft is disengaged.

In an electric type power steering device, an input shaft on a side of a steering wheel and an output shaft on a side of a wheel are connected by a torsion bar, a torsion of the torsion bar is detected by a torque sensor, a torque operated to the torsion bar is detected from a result of the detection, and a necessary steering assisting force is exerted to the output shaft by driving an electric motor.

Therefore, it is necessary to make a neutral state of the steering wheel and a neutral state on the side of the wheel coincide with each other accurately, and assembling is carried out by making a phase of a spline of an upper steering shaft to which rotation of the steering wheel is transmitted and a phase of a spline of a lower steering shaft which transmits rotation to the side of the wheel coincide with each other accurately. Therefore, when the spline engagement of the steering shaft is once disengaged, there poses a problem that time is taken in an operation of reassembling by making the phases of the splines of the upper steering shaft and the lower steering shaft coincide with each other accurately.

According to a steering device of Japanese Unexamined Patent Application Publication No. 2009-154789, when an outer column is clamped to a vehicle body attaching bracket by operating an operating lever, a press contact cam is brought into press contact with an outer peripheral face of an inner column, an engaging protrusion is engaged with an end portion in view of a rear side of a vehicle body of a detachment preventing hole of the inner column, and the outer column is prevented from coming out from the inner column. However, according to the steering device of Patent Document 1, when the outer column is unclamped from the vehicle body attaching bracket by erroneously operating an operating lever in a state before mounting the vehicle body attaching bracket of the steering device to the vehicle body, the press contact cam is separated from the outer peripheral face of the inner column, the engaging protrusion is detached from the detachment preventing hole of the inner column, and therefore, the outer column cannot be prevented from coming out from the inner column.

According to a steering device of Japanese Unexamined Utility Model Application Publication No. 63-43978, a pin fixed to an inner column is telescopically moved by being guided by a long hole formed at an outer column, the inner column is prevented from coming out from the outer column, and rotation of the inner column relative to the outer column is restricted. However, according to the steering device of Japanese Unexamined Patent Application Publication No. 2009-154789, no description has been given of whether the inner column can be prevented from coming out from the outer column when the outer column is unclamped from a vehicle body attaching bracket by erroneously operating an operating lever in a state before attaching the vehicle body attaching bracket of the steering device to a vehicle body.

Japanese Unexamined Patent Application Publication No. 2009-154789

Japanese Unexamined Utility Model Application Publication No. 63-43978

SUMMARY OF THE INVENTION

Problems to be Solved by the Invention

It is a problem of the present invention to provide a steering device which prevents an inner column from coming out from an outer column even when the inner column is released from being telescopically clamped by the outer column in a state before attaching a vehicle body attaching bracket of a steering device to a vehicle body.

Means for Solving the Problem

The above-described problem can be resolved by the following means. That is, a first aspect of the present invention is a steering device characterized in including an inner column which can be fixed to a vehicle body, an outer column which is outwardly fitted to an outer peripheral face of the inner column to be able to adjust a telescopic position, has a slit which is formed over a length in an axial direction of a telescopic position adjusting range, and axially supports pivotably a steering shaft mounted to a steering wheel, a vehicle body attaching bracket which can be attached to a vehicle body to be able to collapse and move to a front side of the vehicle body, a fastening rod which fastens the vehicle body attaching bracket to an inner side in a vehicle width direction by operating an operating lever and clamps the outer column to the vehicle body attaching bracket in order to clamp the outer peripheral face of the inner column and clamp the outer column to the vehicle body attaching bracket by contracting a diameter of an inner peripheral face of the outer column at a desired telescopic position, a telescopic position adjusting long groove which is formed at the outer column, formed to prolong in a telescopic position adjusting direction, and inserted with the fastening rod, a through hole which is formed at the inner column at a phase position the same as a phase position of the slit and on a rear side in view of the vehicle body of the fastening rod, and penetrating from the outer peripheral face to an inner peripheral face of the inner column, and a pop rivet which is fixed to the outer peripheral face of the inner column by enlarging a diameter of a front end portion after protruding the front end portion from a side of the outer peripheral face of the outer column to the inner peripheral face of the inner column by passing the slit and the through hole, and can be brought into contact with the fastening rod.

A second aspect of the present invention is the steering device according to the first aspect of the present invention, characterized in including a collar in a shape of a hollow circular cylinder which is outwardly fitted to an outer peripheral face of the pop rivet, and interposed between a head portion at a rear end of the pop rivet and the outer peripheral face of the inner column.

A third aspect of the present invention is the steering device according to the second aspect of the present invention, characterized in that an outer diameter dimension of the collar is formed to be more or less smaller than a groove width of the slit.

A fourth aspect of the present invention is the steering device according to the third aspect of the present invention, characterized in that the collar is formed by a resin.

Effect of the Invention

The steering device of the present invention includes the inner column which can be fixed to the vehicle body, the outer column which is outwardly fitted to the outer peripheral face of the inner column to be able to adjust the telescopic position, has the slit which is formed over the length in the axial direction of the telescopic position adjusting range, and axially supports pivotably the steering shaft which is mounted with the steering wheel, the vehicle body attaching bracket which can be attached to the vehicle body to be able to collapse and move to the front side of the vehicle body, the fastening rod which fastens the vehicle body attaching bracket to the inner side in the vehicle width direction and clamps the outer column to the vehicle body attaching bracket in order to clamp the outer peripheral face of the inner column and clamp the outer column to the vehicle body attaching bracket by contracting the diameter of the inner peripheral face of the outer column at the desired telescopic position, the telescopic position adjusting long groove which is formed at the outer column, formed to prolong in the telescopic position adjusting direction, and inserted with the fastening rod, the through hole which is formed at the inner column at the phase position the same as the phase position of the slit and on the rear side in view of the vehicle body of the fastening rod, and penetrates from the outer peripheral face to the inner peripheral face of the inner column, and the pop rivet which is fixed to the outer peripheral face of the inner column by enlarging the diameter of the front end portion after protruding the front end portion from the side of the outer peripheral face of the outer column to the inner peripheral face of the inner column by passing the slit and the through hole, and can be brought into contact with the fastening rod.

Therefore, when the steering wheel is pulled to the rear side of the vehicle body by unclamping the outer column from the vehicle body attaching bracket by erroneously operating the operating lever in a state before attaching the vehicle body attaching bracket of the steering device to the vehicle body, the outer column comes out from the inner column to the rear side of the vehicle body. The front end in view of the vehicle body of the telescopic position adjusting long groove is brought into contact with the outer peripheral face of the fastening rod at the rear end in view of the vehicle body of the telescopically adjusting position, and therefore, the fastening rod is moved to the rear side of the vehicle body. The vehicle body attaching bracket is going to come out from the inner column along with the outer column by being pulled by the fastening rod. Then, the fastening rod is brought into contact with the collar, and therefore, the fastening rod cannot further be moved to the rear side of the vehicle body, and the outer column and the vehicle body attaching bracket can be prevented from coming out from the inner column.

BRIEF DESCRIPTION OF THE DRAWINGS

FIG. 9 illustrates enlarged vertical sectional views of a vicinity of the pop rivet attached to the inner column, (a) is an enlarged vertical sectional view showing a state of inserting the pop rivet to the inner column, and (b) is a an enlarged vertical sectional view showing a state of fixing the pop rivet to the inner column by enlarging a diameter of a front end of the pop rivet.

MODE FOR CARRYING OUT THE INVENTION

In the following embodiment, an explanation will be given of an example of applying the present invention to a steering device of a tilt telescopic type which adjusts positions of both of a position in an up and down direction and a position in a front or a rear direction of a steering wheel.

Figure 1:
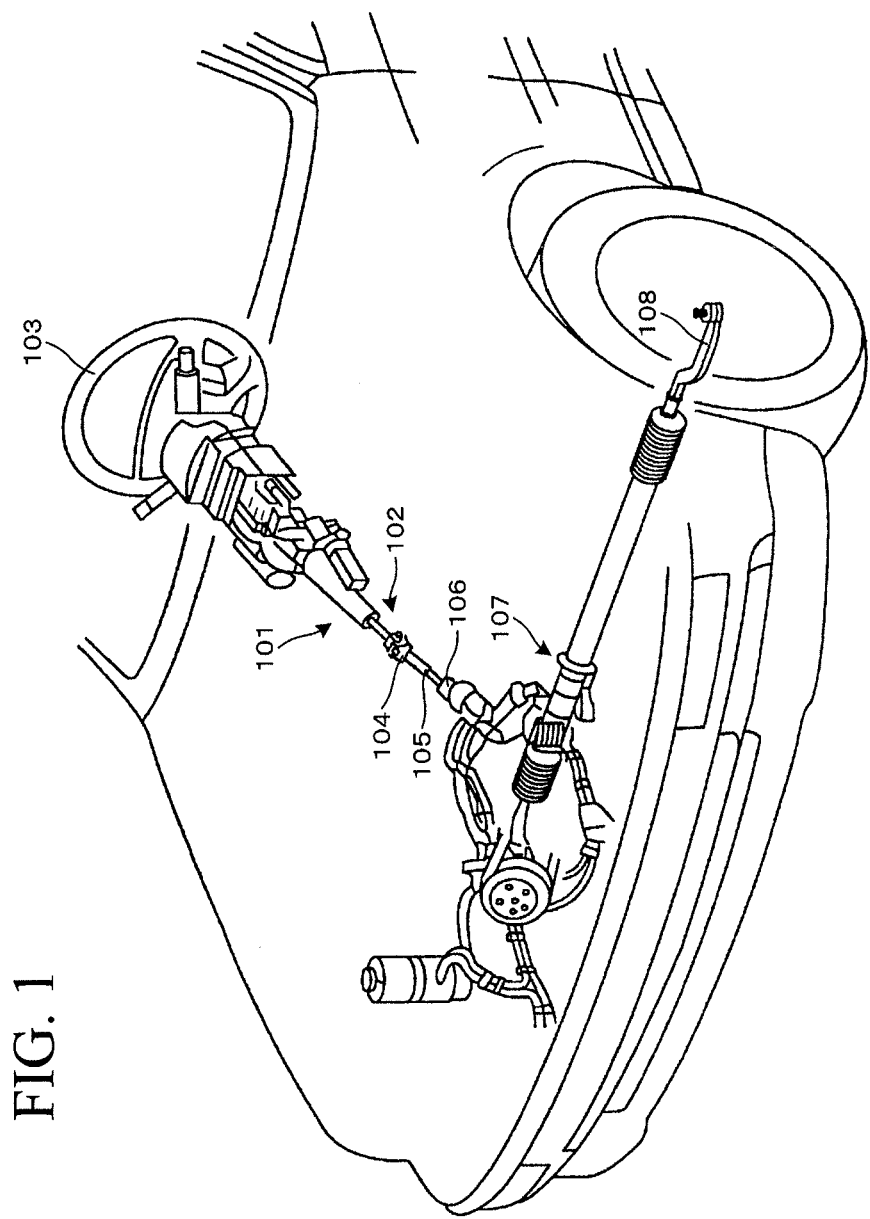
FIG. 1 is a total perspective view showing a state of mounting a steering device 101 according to the present invention to a vehicle.

FIG. 1 is a total perspective view showing a state of mounting a steering device 101 of the present invention to a vehicle. The steering device 101 axially supports a steering shaft 102 pivotably. The steering shaft 102 is mounted with a steering wheel 103 at an upper end thereof (on a rear side of a vehicle body), and a lower end (on a front side of the vehicle body) of the steering shaft 102 is connected with an intermediate shaft 105 via a universal joint 104.

The intermediate shaft 105 is connected with a universal joint 106 at a lower end thereof, and the universal joint 106 is connected with a steering gear 107 configured by a rack and pinion mechanism or the like.

When a driver operates to rotate the steering wheel 103, a turning force thereof is transmitted to the steering gear 107 via the steering shaft 102, the universal joint 104, the intermediate shaft 105, and the universal joint 106, a tie rod 108 is moved via the rack and pinion mechanism, and a steering angle of a wheel can be changed.

Figure 2:
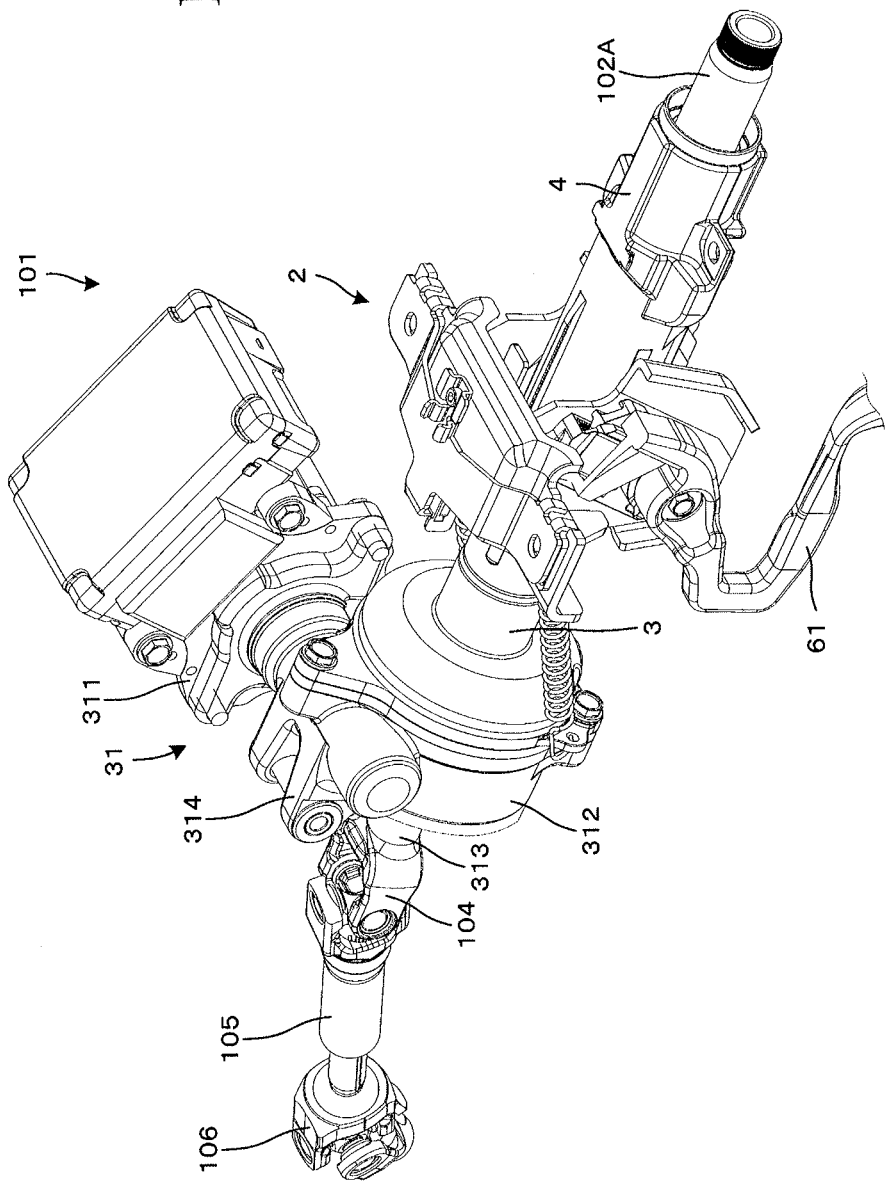
FIG. 2 is a perspective view of an essential port ion viewing the steering device 101 of an embodiment of the present invention from a rear side of a vehicle body.
Figure 3:
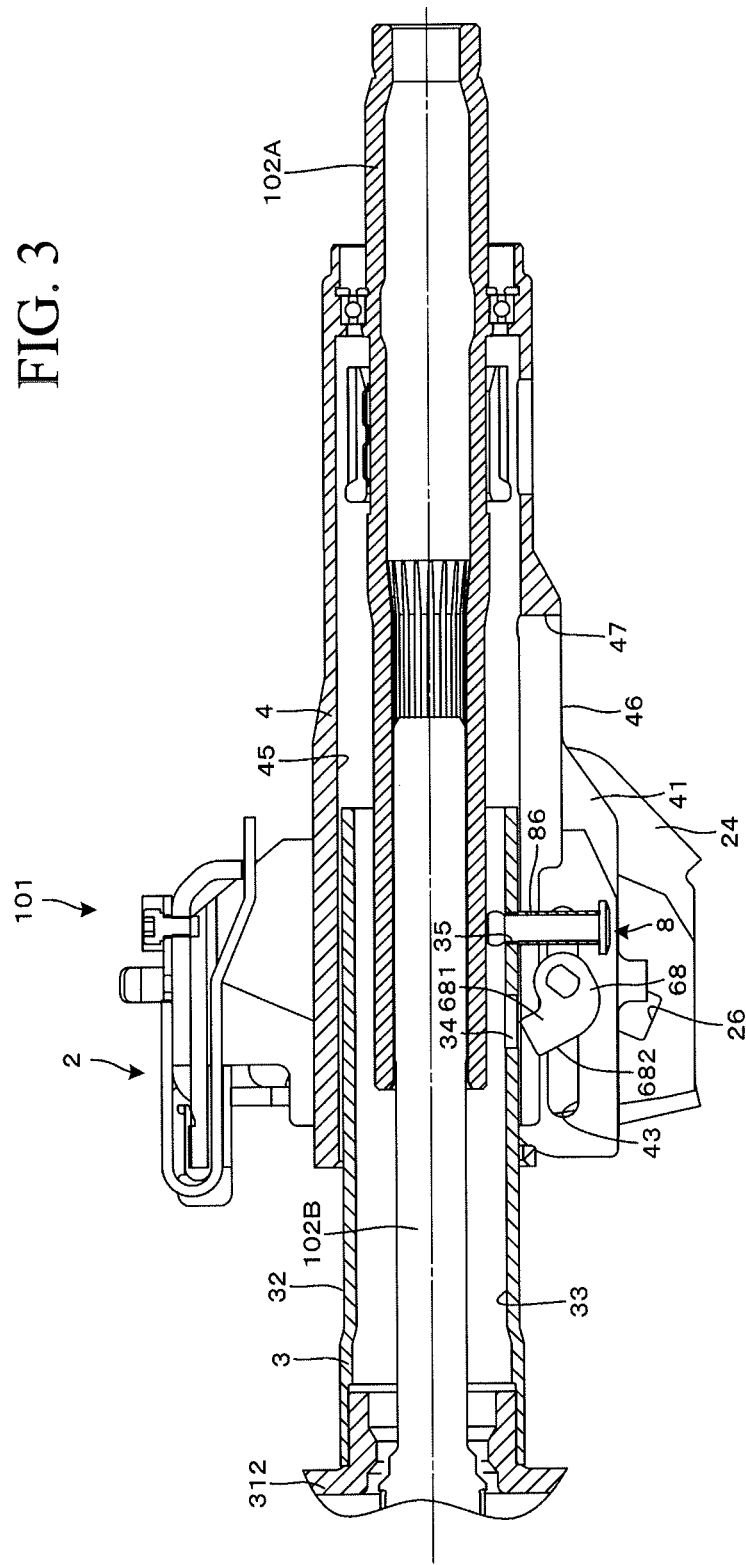
FIG. 3 is a vertical sectional view of a surrounding of a vehicle body attaching bracket of FIG. 2.
Figure 4:
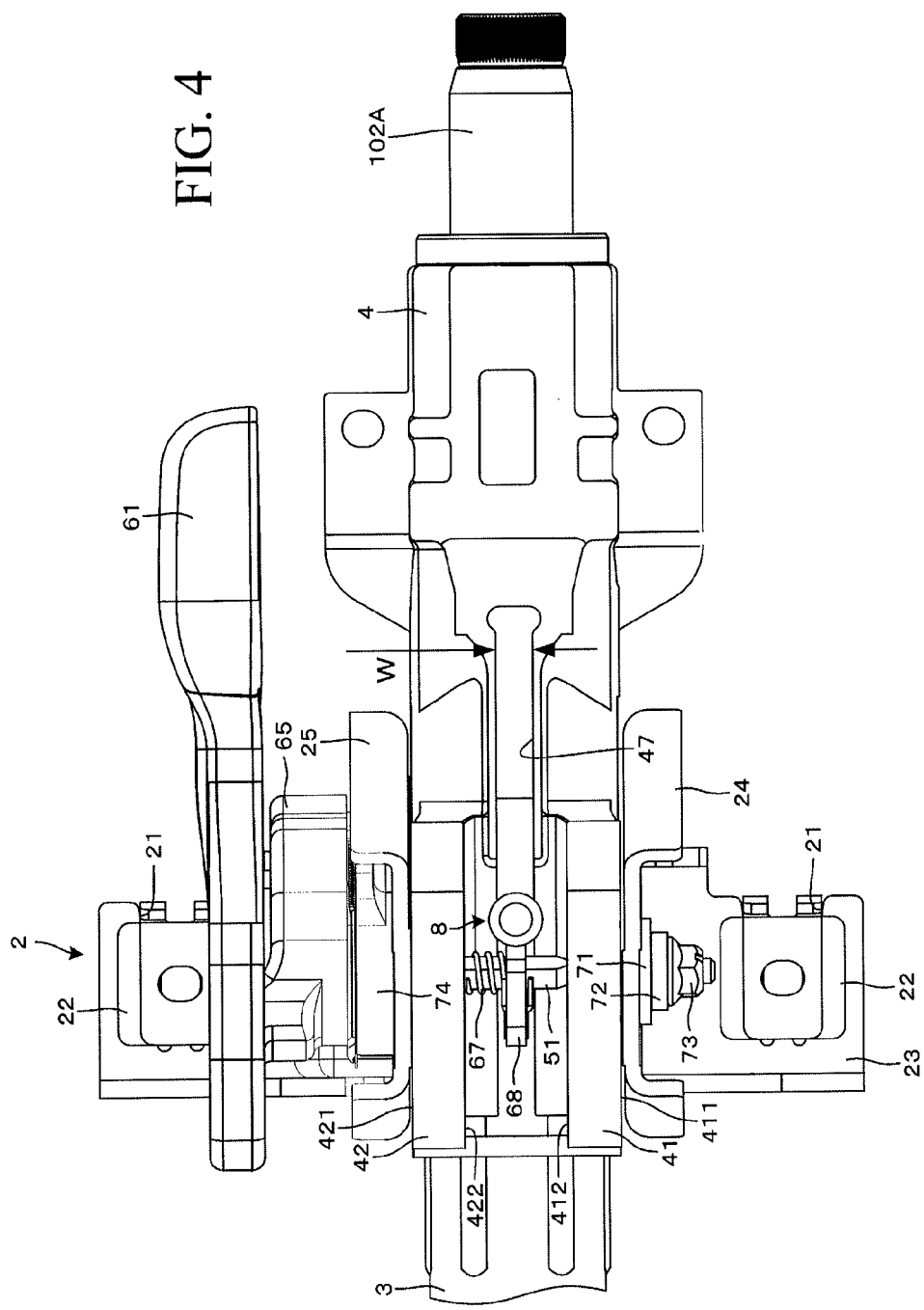
FIG. 4 is a bottom view of FIG. 3.
Figure 5:
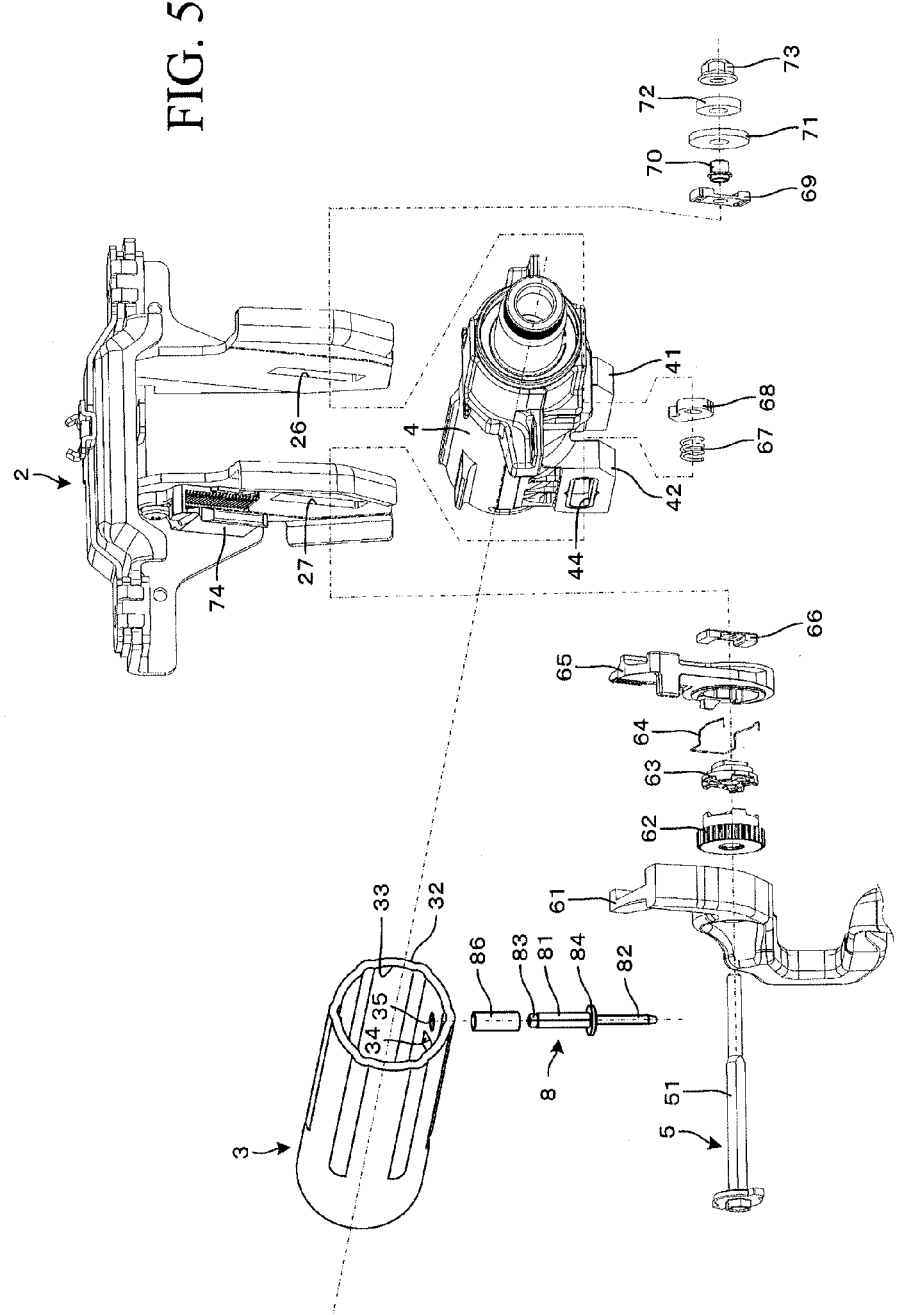
FIG. 5 is a disassembled perspective view viewing FIG. 3 from a rear side of a vehicle body.
Figure 6:
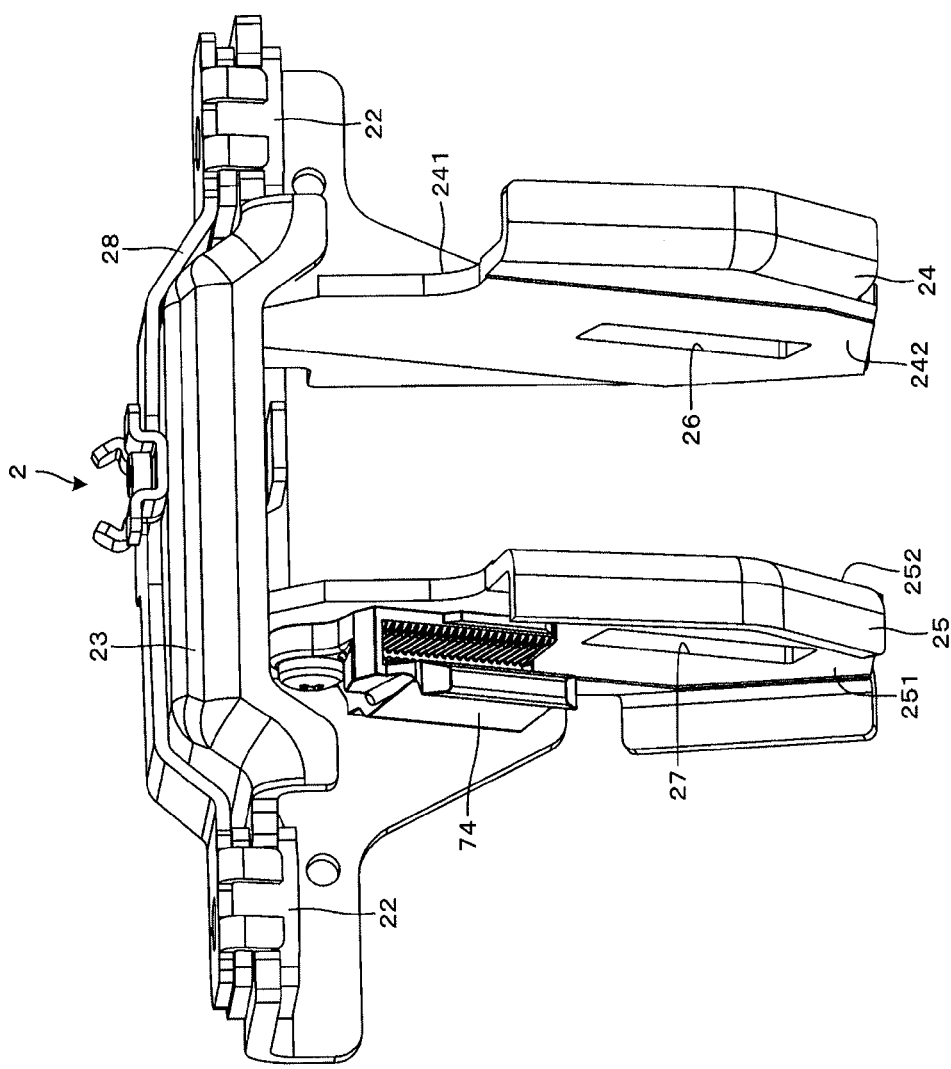
FIG. 6 is an enlarged perspective view of the vehicle body attaching bracket of FIG. 3.
Figure 7:
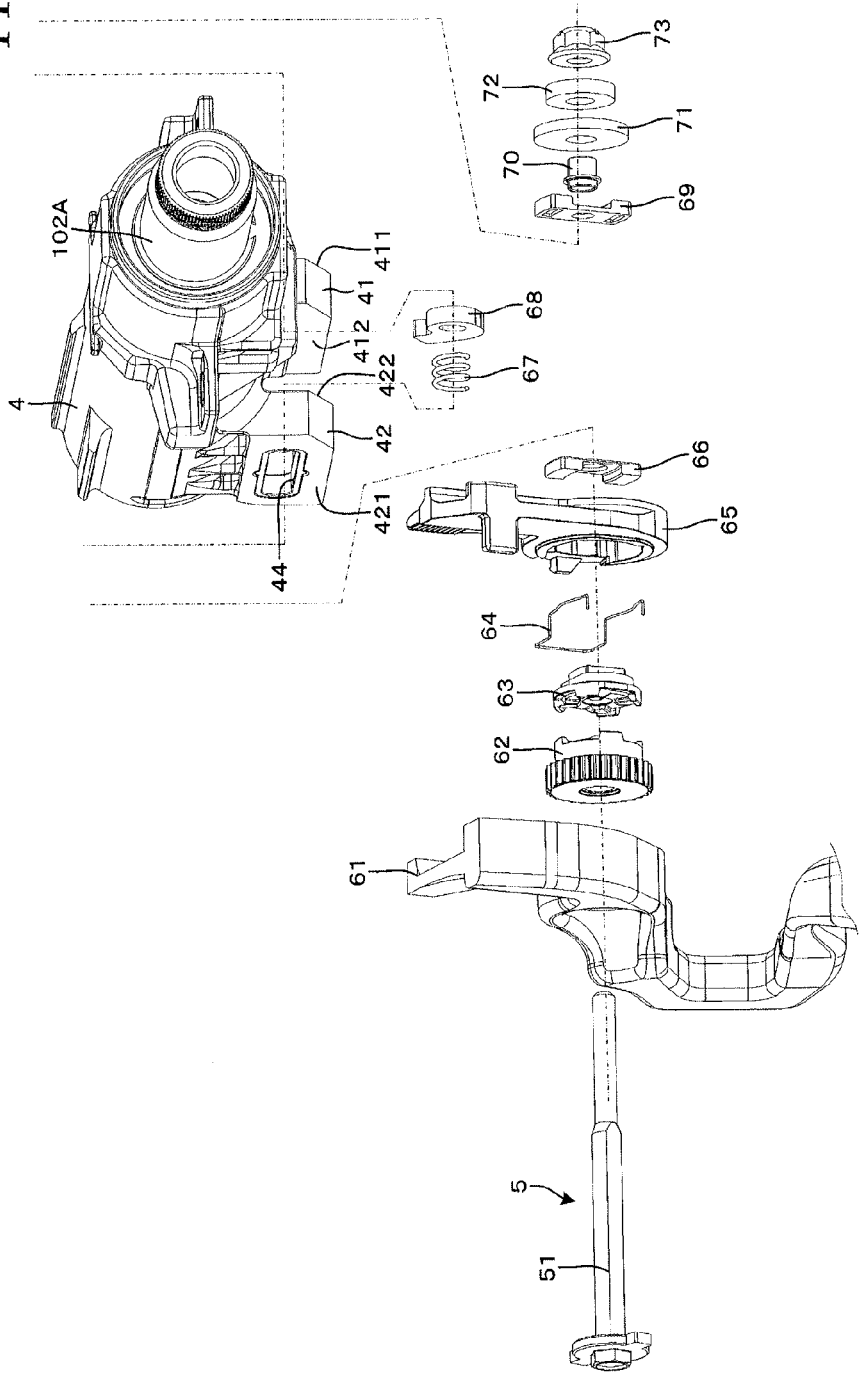
FIG. 7 is an enlarged disassembled perspective view of an outer column and a clamping device of FIG. 3.
Figure 8:
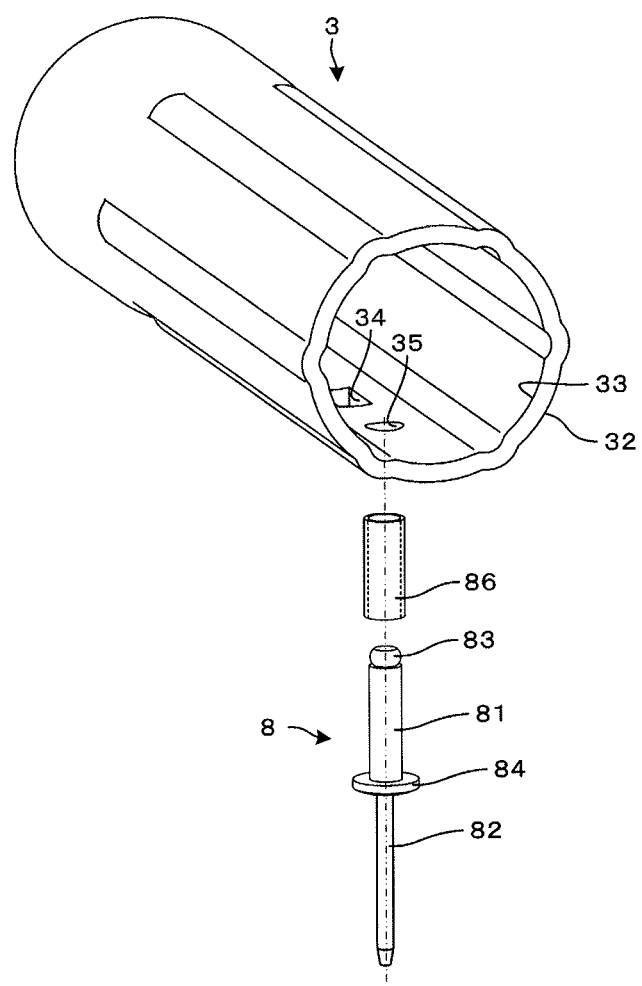
FIG. 8 is an enlarged disassembled perspective view of an inner column and a pop rivet of FIG. 3.

FIG. 2 is a perspective view of an essential portion viewing the steering device 101 of the embodiment of the present invention from a rear side of the vehicle body. FIG. 3 is a vertical sectional view of a surrounding of a vehicle body-mounting bracket of FIG. 2, FIG. 4 is a bottom view of FIG. 3, and FIG. 5 is a disassembled perspective view viewing FIG. 3 from a rear side of the vehicle body. FIG. 6 is an enlarged perspective view of the vehicle body attaching bracket of FIG. 3, and FIG. 7 is an enlarged disassembled perspective view of an outer column and a clamping device of FIG. 3. FIG. 8 is an enlarged disassembled perspective view of an inner column and a pop rivet of FIG. 3. FIG. 9 illustrates enlarged vertical sectional views of a vicinity of the pop rivet attached to the inner column, (a) is an enlarged vertical sectional view showing a state of inserting the pop rivet to the inner column, and (b) is an enlarged vertical sectional view showing a state of fixing the pop rivet to the inner column by enlarging a diameter of a front end of the pop rivet.

Figure 10:
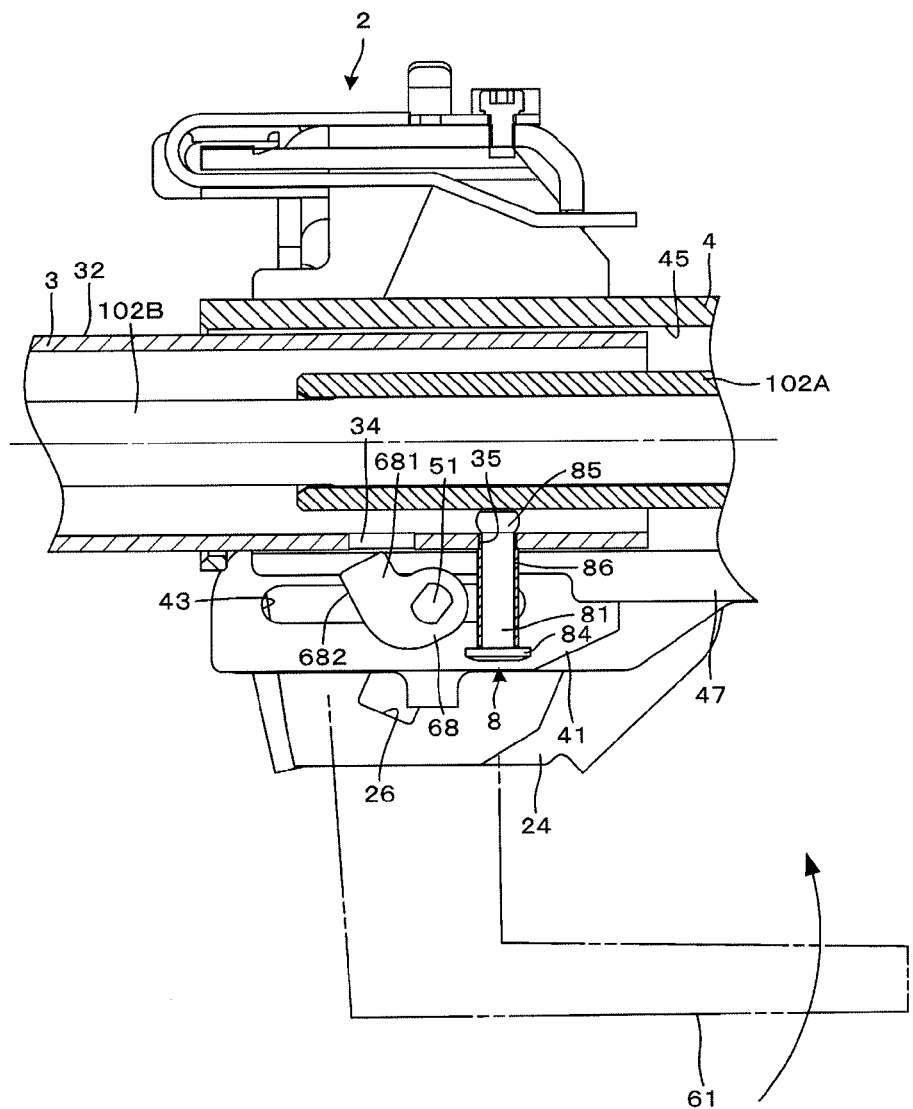
FIG. 10 is an enlarged vertical sectional view showing a state of clamping an outer column to a vehicle body attaching bracket by operating an operating lever.
Figure 11:
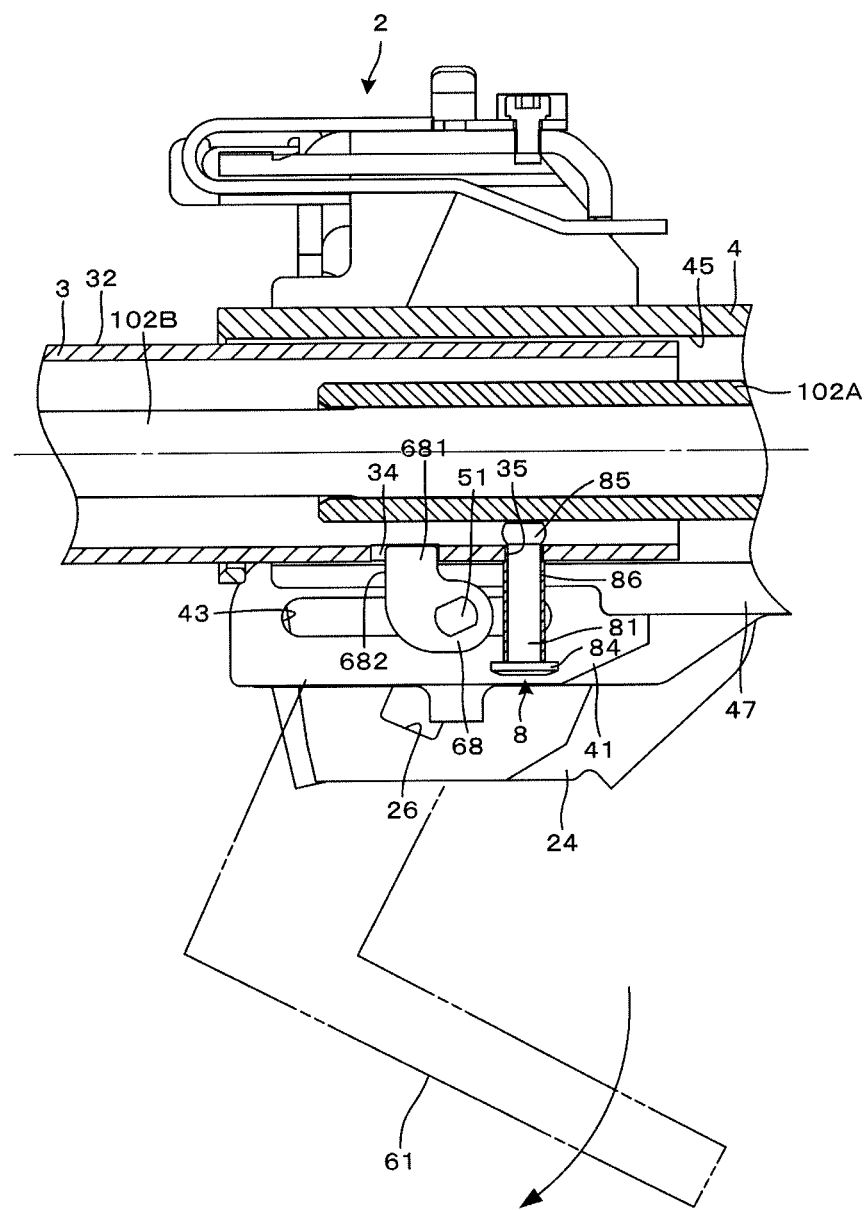
FIG. 11 is an enlarged vertical sectional view showing a state of unclamping the outer column from the vehicle body attaching bracket by operating the operating lever.
Figure 12:
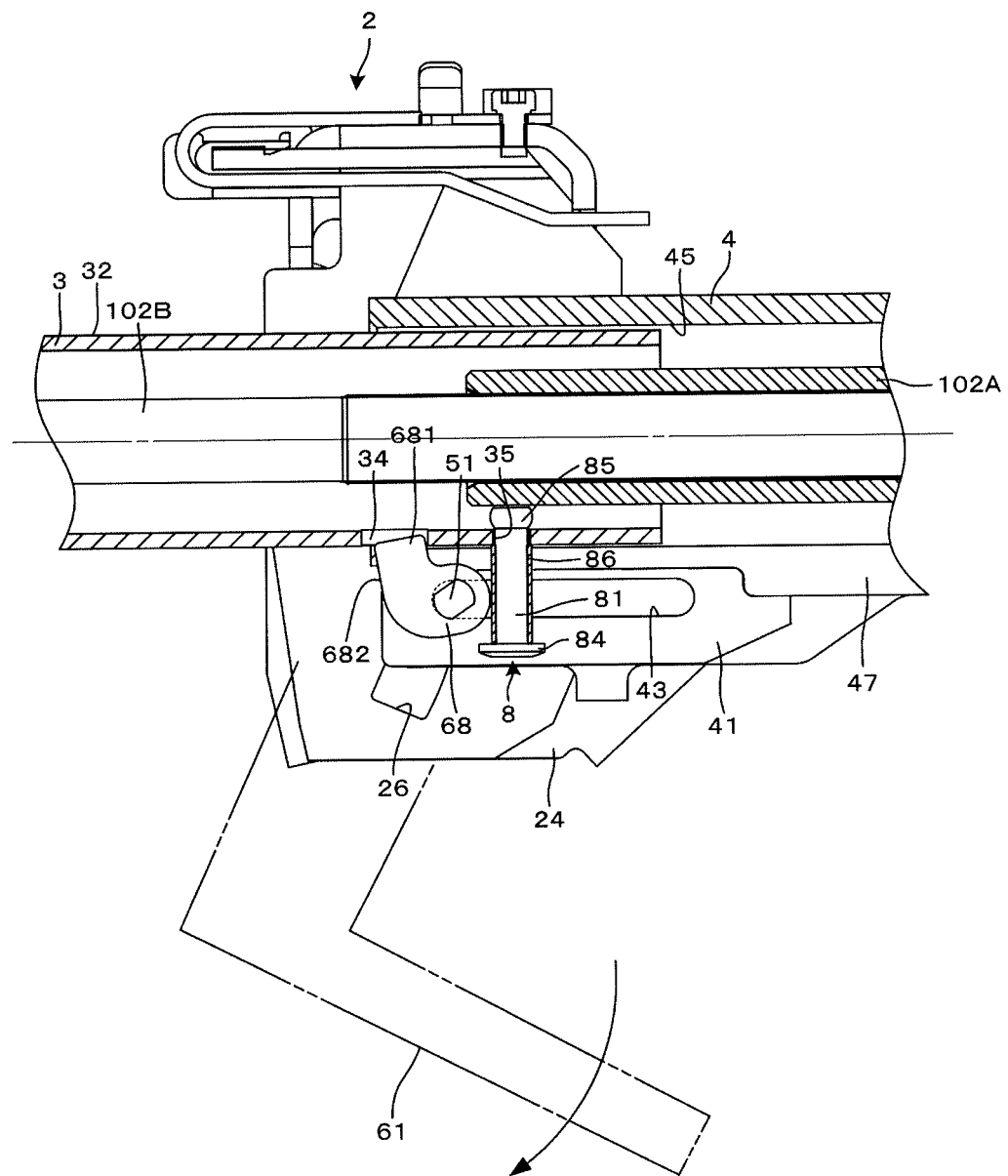
FIG. 12 is an enlarged vertical sectional view showing a state of pulling a steering wheel to a rear side of a vehicle body in a state of unclamping the outer column from the vehicle body attaching bracket.

FIG. 10 is an enlarged vertical sectional view showing a state of clamping the outer column to the vehicle body attaching bracket by operating an operating lever. FIG. 11 is an enlarged vertical sectional view showing a state of unclamping the outer column from the vehicle body attaching bracket by operating the operating lever. FIG. 12 is an enlarged vertical sectional view showing a state of pulling a steering wheel to the rear side of the vehicle body in a state of unclamping the outer column from the vehicle body attaching bracket.

As shown in FIG. 2, the steering device 101 of the embodiment of the present invention is configured by the vehicle body attaching bracket 2, an inner column (lower column) 3, a steering assisting portion 31 (electric assisting mechanism), an outer column (upper column) 4 and the like.

A right end of the steering assisting portion (electrically assisting mechanism) 31 is fixed to a front side of the vehicle body (left side of FIG. 2) of the inner column 3 by press fitting. The steering assisting portion 31 is configured by an electric motor 311, a reduction gearbox portion 312, an output shaft 313 and the like. In the steering assisting portion 31, a bracket 314 integrally formed with a front end in view of the vehicle body of the steering assisting portion 31 is supported by a vehicle body, not illustrated, to be able to adjust a tilt position via a tilt center axis, not illustrated.

As shown in FIG. 3, an inner peripheral face 45 of the outer column 4 is outwardly fitted to an outer peripheral face 32 of the inner column 3 to be able to adjust a telescopic position (slidably move in parallel with a center axis line of the inner column 3). An upper steering shaft 102A is axially supported pivotably by the outer column 4, and the steering wheel 103 (refer to FIG. 1) is fixed to an end portion on a rear side in view of the vehicle body (right side of FIG. 2) of the upper steering shaft 102A. A slit 47 penetrating from an outer peripheral face 46 to the inner peripheral face 45 of the outer column 4 is formed on a lower side in view of the vehicle body of the outer column 4. The slit 47 has a shape in which both of a front end side in view of the vehicle body and a rear end side in view of the vehicle body of the outer column 4 are closed.

A lower steering shaft 102B is axially supported pivotably by the inner column 3, and the lower steering shaft 102B is fitted to the upper steering shaft 102A by a spline. Therefore, rotation of the upper steering shaft 102A is transmitted to the lower steering shaft 102B regardless of a telescopic position of the outer column 4.

The steering assisting portion 31 detects a torque operated to the lower steering shaft 102B, and rotates the output shaft 313 by a necessary steering assisting force by driving the electric motor 311. Rotation of the output shaft 313 is transmitted to the steering gear 107 by way of the universal joint 104, the intermediate shaft 105, and the universal joint 106, and the steering angle of the wheel can be changed.

A front side in view of the vehicle body (left sides of FIG. 2, FIG. 3) of the outer column 4 is attached with the vehicle body attaching bracket 2 which sandwiches the outer column 4 from both left and right sides in a vehicle width direction. As shown in FIG. 3 through FIG. 6, the vehicle body attaching bracket 2 includes an upperplate 23 which is formed substantially horizontally in the vehicle width direction, and a pair of left and right side plates 24 and 25 which are extended to a lower side of the vehicle body from the upper plate 23 and sandwiches the outer column 4 from both left and right sides in the vehicle width direction.

The upper plate 23 is formed with notched grooves (which are formed by opening a rear side in view of the vehicle body of the upper plate 23) 21, 21 and the upper plate 23 is mounted to the vehicle body via capsules 22 and an impact absorbing plate (refer to FIG. 6) 28 fitted to the notched grooves 21 and 21.

According to the vehicle body attaching bracket 2 and the outer column 4, when a driver is impacted to the steering wheel 103 in second collision and a large impact force is operated thereto, the vehicle body attaching bracket 2 is detached from the capsules 22 to the front side of the vehicle body, and is collapsed to move to the front side of the vehicle body by being guided by the inner column 3, and the impact absorbing plate 28 is plastically deformed and absorbs an impact energy in collision.

The front side in view of the vehicle body of the outer column 4 is integrally formed with a pair of clamp members 41 and 42 by being protruded to a lower side in view of the vehicle body of the outer column 4. The clamp members 41 and 42 are formed with long grooves 43 and 44 for adjusting a telescopic position which are extended to prolong in an axis center direction of the outer column 4. Further, the side plates 24 and 25 of the vehicle body attaching bracket 2 are formed with tilt adjusting long grooves 26 and 27. The tilt adjusting long grooves 26 and 27 are formed in a circular arc shape centering on a tilt center axis. Outer side faces 411 and 421 of the clamp members 41 and 42 are slidably brought into contact with inner side faces 242 and 252 of the side plates 24 and 25 of the vehicle body attaching bracket 2.

As shown in FIG. 5 and FIG. 7, a fastening rod 5 in a shape of a round bar is inserted from left sides of FIG. 5 and FIG. 7 by passing the tilt adjusting long grooves 26 and 27 and the telescopic position adjusting long grooves 43 and 44. An operating lever 61, a movable cam 62, a fixed cam 63, a movable tilt lock gear 65, and a tilt spacer 66 are outwardly fitted to a left end side of the fastening rod 5 successively from a left side, and passes through the tilt adjusting long groove 27 and the telescopic position adjusting long groove 44.

Thereafter, a spring (coil spring) 67 and an engaging member 68 inserted between inner side faces 412 and 422 of the clamp members 41 and 42 are outwardly fitted to the fastening rod 5, and a right end of the fastening rod 5 is passed through the telescopic position adjusting long groove 43 and the tilt adjusting long groove 26. Successively, a tilt spacer 69, a cylindrical spacer 70, a washer 71, and a thrust bearing 72 are outwardly fitted to a right end side of the fastening rod 5 successively from a left side, and a calking nut 73 is calked to be fixed to the right end of the fastening rod 5.

As shown in FIG. 3, a lower side in view of the vehicle body of the inner column 3 is formed with an engaging groove 34 penetrating from the outer peripheral face 32 to an inner peripheral face 33 of the inner column 3. The engaging groove 34 is formed at a phase position the same as a phase position of the slit 47 of the outer column 4. As shown in FIG. 3, in a state of clamping the outer column 4 to the vehicle body attaching bracket 2, the engaging member 68 is rotated in the counterclockwise direction along with the fastening rod 5, and an engaging protrusion 681 of the engaging member 68 is detached from the engaging groove 34.

A length in an axial direction of the engaging groove 34 is formed by the shortest length to a degree by which when the engaging protrusion 681 of the engaging member 68 is engaged with and detached from the engaging groove 34, the engaging protrusion 681 does not interfere with a front end in view of the vehicle body and a rear end in view of the vehicle body of the engaging groove 34. Therefore, when the inner peripheral face 45 of the outer column 4 is contracted in a diameter thereof to fasten to clamp (telescopically clamp) the outer peripheral face 32 of the inner column 3, an amount of crushing the inner column 3 is restrained to be small, and a reduction in a telescopic clamping force can be restrained.

The fixed cam 63 is made to stop rotating by fitting a rectangular portion formed at a right end face of the fixed cam 63 to the tilt adjusting long groove 27. A left side of the fastening rod 5 is formed with a rectangular outer peripheral face 51 over a predetermined length in the axial direction. The rectangular outer peripheral face 51 of the fastening rod 5 is inwardly fitted to rectangular holes formed at the operating lever 61 and the engaging member 68 to be able to transmit a rotating torque. The movable cam 62 is press-fit to the operating lever 61, and pivotably moved integrally with the operating lever 61.

Plural gears are formed at the movable tilt lock gear 65 in a tilting direction, and are brought in mesh with plural gears of a fixed tilt lock gear 74 fastened to an outer peripheral face 251 of the side plate 25 by a bolt to make a holding force in the tilting direction strong. A spring 64 is inserted between a right end face of the fixed cam 63 and a left end face of the movable tilt lock gear 65, and when the outer column 4 is unclamped from the vehicle body attaching bracket 2, play of the operating lever 61 is reduced, and the movable tilt lock gear 65 is made to float relative to the fixed cam 63 such that the movable tilt lock gear 65 and the fixed tilt lock gear 74 are smoothly brought in mesh with each other.

The tilt spacers 66 and 69 are made of a synthetic resin, and have substantially rectangular shapes prolonged in the tilting direction, and formed by a width between two faces of a dimension substantially the same as groove lengths of the tilt adjusting long grooves 26 and 27. Therefore, the tilt spacers 66 and 69 are inwardly fitted to the tilt adjusting long grooves 26 and 27 and slidably moved smoothly in the tilt adjusting direction when the tilting position of the outer column 4 is adjusted.

As shown in FIG. 3, FIG. 4, FIG. 8, and FIG. 9, a pop rivet 8 is fixed to a lower side in view of the vehicle body of the inner column 3. The pop rivet 8 is configured by a rivet main body 81 in a shape of a hollow hole circular cylinder, and a mandrel 82 inserted to a hollow hole of the rivet main body 81. A spherical portion 83 is formed at a front end of the mandrel 82 (upper ends of FIG. 3, FIG. 8, and FIG. 9), and a head portion 84 in a shape of a large diameter circular disk is formed at a rear end of the rivet main body 81 (lower ends of FIG. 3, FIG. 8, and FIG. 9).

A lower side in view of the vehicle body of the inner column 3 is formed with a through hole 35 in a circular shape penetrating from the outer peripheral face 32 to the inner peripheral face 33 more or less on a rear side in view of the vehicle body of the engaging groove 34 and the fastening rod 5. The through hole 35 is formed at a phase position the same as a phase position of the slit 47 of the outer column 4. An outer diameter dimension of the rivet main body 81 is formed to be more or less smaller than an inner diameter dimension of the through hole 35. As shown in FIG. 9(a), after outwardly fitting a collar 86 in a shape of a hollow circular cylinder and made of a resin to an outer peripheral face of the rivet main body 81, a front end portion of the rivet main body 81 is protruded at the inner peripheral face 33 of the inner column 3 by passing through the slit 47 and the through hole 35 from a side of the outer peripheral face 46 of the outer column 4.

Next, the mandrel 82 is pulled to a lower side by grasping a rear end (lower ends of FIG. 3, FIG. 8 and FIG. 9) of the mandrel 82 by a rivet tool, not illustrated. Then, the spherical portion 83 at the front end of the mandrel 82 enlarges a diameter of a front end portion of the rivet main body 81, an expanded diameter portion 85 in a spherical shape is formed at the front end portion of the rivet main body 81, the rivet main body 81 is contracted in an axial direction, and the mandrel 82 is broken on the lower side of the spherical portion 83.

The collar 86 is fastened between the head portion 84 of the rivet main body 81 and the outer peripheral face of the inner column 3, and the pop rivet 8 is fixed to the inner column 3. By outwardly fitting the collar 86 to the outer peripheral face of the rivet main body 81, it is facilitated to set a force in an axial direction of fixing the pop rivet 8 to the inner column 3 to a desired magnitude. Further, by outwardly fitting the collar 86 to the outer peripheral face of the rivet main body 81, it is facilitated to set a length of protruding the rivet main body 81 from the outer peripheral face 32 of the inner column 3 to the lower side by a predetermined length.

An outer diameter dimension D (refer to FIG. 9(b)) of the collar 86 is formed to be more or less smaller than a groove width W (refer to FIG. 4) in a vehicle width direction of the slit 47 when a diameter of the inner peripheral face 45 of the outer column 4 is contracted to telescopically clamp. Further, a length in an axial direction of the slit 47 is set to a length by which a rear end in view of the vehicle body of the slit 47 does not interfere with the collar 86 when the outer column 4 is adjusted in a telescopic direction along the inner column 3. The collar 86 is made of a resin, and therefore, an abrasive sound of abrading with the slit 47 in adjusting the telescopic position, or a contact sound when the engaging member 68 is brought into contact with the collar 86 can be restrained. Although in the embodiment described above, the collar 86 is made of a resin, the collar 86 may be made of a metal so far as the abrasive sound can be restrained, and when the collar 86 is made of a metal, the collar 86 is advantageous in view of a strength thereof.

FIG. 3 and FIG. 10 are vertical sectional views showing a state of clamping the outer column 4 to the vehicle body attaching bracket 2 by operating to pivot the operating lever 61 in the counterclockwise direction. When the operating lever 61 is pivotably moved in a clamping direction, a ridge of an inclined cam face of the movable cam 62 is mounted on a ridge of an inclined cam face of the fixed cam 63, an inner side end face in the vehicle width direction of the fixed cam 63 pushes the outer side face 251 of the side plate 25 on the left side to an inner side, the side plate 25 on the left side is elastically deformed to the inner side, and the outer side face 421 of the clamp member 42 on the left side of the outer column 4 is strongly pressed.

When the ridge of the inclined cam face of the movable cam 62 is mounted on the ridge of the inclined cam face of the fixed cam 63, the fastening rod 5 is pulled to the left sides of FIG. 5 and FIG. 7, the washer 71 pushes an outer side face 241 of the side plate 24 on the right side to the inner side, the side plate 24 on the right side is elastically deformed to the inner side, and the outer side face 411 of the clamp member 41 on the right side of the outer column 4 is strongly pressed.

In this way, the left and right clamp members 41 and 42 of the outer column 4 can be tilted to clamp to the vehicle attaching bracket 2 by fastening the vehicle attaching bracket 2 by a large holding force at a predetermined tilting adjusting position. Further, the clamp members 41 and 42 are elastically deformed to the inner side in a direction of making the inner side faces 412 and 422 of the clamp members 41 and 42 proximate to each other, and a groove width of the slit 47 of the outer column 4 is narrowed. Therefore, the inner peripheral face 45 of the outer column 4 is contracted in the diameter, and fastens to clamp (telescopically clamp) the outer peripheral face 32 of the inner column 3. As shown in FIG. 10, in a state of tilting and clamping and telescopically clamping, the engaging protrusion 681 of the engaging member 68 is detached from the engaging groove 34.

FIG. 11 is an enlarged vertical sectional view showing a state of unclamping the outer column 4 from the vehicle body attaching bracket 2 by operating the operating lever 61. When a driver operates to pivot the operating lever 61 in the clockwise direction, a ridge of the inclined cam face of the fixed cam 63 and a valley of the inclined cam face of the movable cam 62 are brought in mesh with each other. Then, positions in axial directions of the fixed cam 63 and the movable cam 62 are relatively proximate to each other. The side plates 24 and 25 of the vehicle body attaching bracket 2 in which an interval between the side plates 24 and 25 in a free state is set more widely than a width between the outer side faces 411 and 421 of the left and right clamp members 41 and 42 of the outer column 4 are respectively elastically recovered in a direction opposed to the sandwiching direction.

Thereby, the outer column 4 is brought into a state of being free from the side plates 24 and 25 of the vehicle body attaching bracket 2. Further, the clamp members 41 and 42 are elastically recovered to outer sides in a direction of separating the inner side faces 412 and 422 of the clamp members 41 and 42 from each other, and the groove width of the slit 47 of the outer column 4 is widened. Therefore, the inner peripheral face 45 of the outer column 4 is widened in a diameter thereof, and loosens to unclamp (telescopically unclamp) the outer peripheral face 32 of the inner column 3.

As shown in FIG. 11, in a state of being tiltingly unclamped and telescopically unclamped, the engaging member 68 is rotated in the clockwise direction along with the fastening rod 5, and the engaging protrusion 681 of the engaging member 68 is engaged with the engaging groove 34. As shown in FIG. 11, a contact face 682 on the front side in view of the vehicle body of the engaging protrusion 681 is brought into a state of being substantially in parallel with the front end in view of the vehicle body of the engaging groove 34.

In a state of being tiltingly unclamped and telescopically unclamped, more or less play is produced in the rotating direction of the fastening rod 5. At this occasion, the spring (urging member) 67 inserted between the inner side face 422 of the clamp member 42 and the engaging member 68 urges the engaging member 68 in an axial direction of the fastening rod 5 to press a side face in a vehicle width direction of the engaging member 68 to the engaging groove 34 and prevents the engaging member 68 from being shifted from an engaging position of the engaging groove 34 by rotating the engaging member 68.

Under the state, the adjustment of the steering wheel 103 in a tilting direction can arbitrarily be carried out by displacing the outer column 4 in the tilting direction while guiding the fastening rod 5 by the tilt adjusting long grooves 26 and 27 of the vehicle body attaching bracket 2. Further, the adjustment of the steering wheel 103 in the telescopic direction can arbitrarily be carried out by displacing the outer column 4 in the telescopically moving direction along the outer peripheral face 32 of the inner column 3 while guiding the telescopically adjusting long grooves 43 and 44 of the outer column 4 by the fastening rod 5.

Assume a case in which when the telescopically moving position of the steering wheel 103 is disposed at a vicinity of an adjustment end on the front side of the vehicle body, a large force is exerted erroneously to the steering wheel 103 toward the front side of the vehicle body. Then, rear ends in view of the vehicle body of the telescopically adjusting long grooves 43 and 44 of the outer column 4 are brought into contact with the fastening rod 5, and push the fastening rod 5 to the front side of the vehicle body. When the fastening rod 5 is more or less pushed to the front side of the vehicle body, the contact face 682 on the front side of the vehicle body of the engaging protrusion 681 is brought into face contact with the front end in view of the vehicle body of the engaging groove 34, and pushes the inner column 3 to the front side of the vehicle body.

The front side in view of the vehicle body of the inner column 3 is fixed to the vehicle body by the bracket 314. Therefore, a large force to the front side of the vehicle body exerted to the steering wheel 103 is supported by the vehicle body via the inner column 3, and a force exerted to the vehicle body attaching bracket 2 can be reduced. Therefore, the vehicle body attaching bracket 2 can be prevented from detaching from the vehicle body.

In a state before attaching the vehicle body attaching bracket 2 of the steering device 101 described above to the vehicle body, there is a case of unclamping the outer column 4 from the vehicle body attaching bracket 2 by operating to pivot the operating lever 61 erroneously in the clockwise direction in transporting the steering device 101, or assembling a column cover or the like. When the steering wheel 103 is pulled to the rear side of the vehicle body under the state, the outer column 4 comes out from the inner column 3 to the rear side of the vehicle body.

As shown in FIG. 12, front ends in view of the vehicle body of the telescopic position adjusting long grooves 43 and 44 are brought into contact with an outer peripheral face of the fastening rod 5 at a rear end in view of the vehicle body of the telescopically adjusting position, and therefore, the fastening rod 5 is moved to the rear side of the vehicle body. The vehicle body attaching bracket 2 is going to come out from the inner column 3 along with the outer column 4 by being pulled by the fastening rod 5. Then, the engaging member 68 outwardly fitted to the fastening rod 5 is brought into contact with the collar 86, and therefore, the fastening rod 5 cannot move to the rear side of the vehicle body further, and the outer column 4 and the vehicle body attaching bracket 2 can be prevented from coming out from the inner column 3. Although according to the embodiment described above, the engaging member 68 outwardly fitted to the fastening rod 5 is brought into contact with the collar 86, the fastening rod 5 may directly be brought into contact with the collar 86.

Although in the embodiment described above, the explanation has been given of the case of applying the present invention to the steering device of the tilt telescopic type which can carry out both of the tilt position adjustment and telescopic position adjustment, the present invention may be applied to a steering device of a telescopic type which can carry out only the telescopic position adjustment.

DESCRIPTION OF THE REFERENCE NUMERALS AND SIGNS 101 steering device
102 steering shaft
102A upper steering shaft
102B lower steering shaft
103 steering wheel
104 universal joint
105 intermediate shaft
106 universal joint
107 steering gear
108 tie rod
2 vehicle body attaching bracket
21 notched groove
22 capsule
23 upper plate
24 side plate
241 outer side face
242 inner side face
25 side plate
251 outer side face
252 inner side face
26, 27 tilt adjusting long grooves
28 impact absorbing plate
3 inner column
31 steering assisting portion
311 electric motor
312 reduction gearbox portion
313 output shaft
314 bracket
32 outer peripheral face
33 inner peripheral face
34 engaging groove
35 through hole
4 outer column
41, 42 clamp members
411, 421 outer side faces
412, 422 inner side faces
43, 44 telescopic position adjusting long grooves
45 inner peripheral face
46 outer peripheral face
47 slit
5 fastening rod
51 rectangular outer peripheral face
61 operating lever
62 movable cam
63 fixed cam
64 spring
65 movable tilt lock gear
66 tilt spacer
67 spring
68 engaging member
681 engaging protrusion
682 contact face
69 tilt spacer
70 cylindrical spacer
71 washer
72 thrust bearing
73 calking nut
74 fixed tilt lock gear
8 pop rivet
81 rivet main body
82 mandrel
83 spherical portion
84 head portion
85 expanded diameter portion
86 collar

The invention claimed is:

1. A steering device, comprising:
an inner column that is configured to be fixed to a vehicle body;
an outer column that is outwardly fitted to an outer peripheral face of the inner column to thereby adjust a telescopic position of the steering device, the outer column having a slit that is formed along a length of the outer column in an axial direction of a telescopic position adjusting range, the outer column axially and pivotably supporting a steering shaft that is mounted to a steering wheel;
a vehicle body attaching bracket that is configured to: i) be attached to the vehicle body, ii) collapse, and iii) move to a front side of the vehicle body;
a fastening rod that is configured to fasten the vehicle body attaching bracket to the outer column in a vehicle width direction by operating an operating lever that clamps the outer column to the vehicle body attaching bracket, the operating lever clamping the outer peripheral face of the inner column and the outer column to the vehicle body attaching bracket by contracting a diameter of an inner peripheral face of the outer column at a desired telescopic position;
a telescopic position adjusting long groove that is formed on the outer column, the telescopic position adjusting long groove being: i) configured to extend in a telescopic position adjusting direction, and ii) penetrated by the fastening rod;
a through hole that is formed on the inner column at a phase position that is the same as a phase position of the slit, the through hole: i) being formed on a side of the inner column that is closest to the steering wheel, and ii) spanning from the outer peripheral face of the inner column to an inner peripheral face of the inner column; and
a pop rivet that is: i) fixed to the outer peripheral face of the inner column by enlarging a diameter of a front end portion of the pop rivet after protruding the front end portion from a side of an outer peripheral face of the outer column to the inner peripheral face of the inner column by passing through the slit and through the through hole, and ii) configured to be brought into contact with the fastening rod.

2. The steering device according to claim 1, further comprising:
a collar in a shape of a hollow circular cylinder that is: i) outwardly fitted to an outer peripheral face of the pop rivet, and ii) interposed between a head portion at a rear end of the pop rivet and the outer peripheral face of the inner column.

3. The steering device according to claim 2, wherein an outer diameter dimension of the collar is smaller than a groove width of the slit.

4. The steering device according to claim 3, wherein the collar is formed by a resin.

* * * * *